(12) United States Patent
Huang et al.

(10) Patent No.: US 12,556,990 B2
(45) Date of Patent: Feb. 17, 2026

(54) SYSTEMS AND METHODS FOR HANDOVER FOR MOBILE INTEGRATED ACCESS AND BACKHAUL NODES

(71) Applicant: Verizon Patent and Licensing Inc., Basking Ridge, NJ (US)

(72) Inventors: Wei David Huang, Danville, CA (US); Vishwanath Ramamurthi, San Ramon, CA (US); Mamadou Mamoune Niang, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 428 days.

(21) Appl. No.: 18/066,014

(22) Filed: Dec. 14, 2022

(65) Prior Publication Data

US 2024/0205770 A1   Jun. 20, 2024

(51) Int. Cl.
  *H04W 36/08* (2009.01)
  *H04W 36/30* (2009.01)
  *H04W 36/32* (2009.01)
  *H04W 74/04* (2009.01)
  *H04W 76/12* (2018.01)

(52) U.S. Cl.
  CPC ........... *H04W 36/08* (2013.01); *H04W 36/30* (2013.01); *H04W 36/32* (2013.01); *H04W 76/12* (2018.02); *H04W 74/04* (2013.01)

(58) Field of Classification Search
  CPC ..... H04W 36/08; H04W 36/30; H04W 36/32; H04W 36/00837; H04W 74/04; H04W 76/12
  See application file for complete search history.

(56) References Cited

U.S. PATENT DOCUMENTS

| | | | |
|---|---|---|---|
| 2015/0131618 A1* | 5/2015 | Chen | H04W 84/005 370/332 |
| 2015/0195757 A1* | 7/2015 | Tietz | H04W 36/08 455/438 |
| 2019/0268815 A1* | 8/2019 | Zhu | H04W 36/0033 |
| 2021/0176670 A1* | 6/2021 | Keskitalo | H04L 5/0048 |
| 2022/0361067 A1* | 11/2022 | Koskinen | H04B 7/15528 |
| 2023/0180327 A1* | 6/2023 | Fujishiro | H04W 36/00 370/329 |
| 2023/0370936 A1* | 11/2023 | Eklöf | H04W 36/00692 |
| 2024/0121695 A1* | 4/2024 | Sharma | H04W 36/0058 |
| 2024/0137828 A1* | 4/2024 | Fujishiro | H04W 36/0061 |
| 2025/0024419 A1* | 1/2025 | Zhu | H04W 60/04 |

* cited by examiner

Primary Examiner — Robert C Scheibel (57) ABSTRACT

A system may include a mobile integrated access and backhaul (M-IAB) base station configured to serve a set of user equipment (UE) devices; and a parent base station configured to establish a backhaul link for the M-IAB base station. The parent base station may be further configured to provide configuration data to the M-IAB base station that causes the M-IAB base station to report when a triggering condition for preparing a handover to a target parent node is satisfied; detect that the triggering condition is satisfied; and send, in response, a request to the target parent node to prepare the handover. The M-IAB base station may be further configured to detect that a handover condition is satisfied and send a handover request to the target parent node using the configuration data, in response to detecting that the handover condition is satisfied.

20 Claims, 8 Drawing Sheets

| M-IAB ID 510 | TRAJECTORY 520 | NEIGHBOR LIST 530 | TRIGGER CONDITIONS 540 | RACH INFO 550 |

| MOBILITY SPEED 610 | HANDOVER PREPARATION TRIGGER 620 | HANDOVER TRIGGER 630 |
|---|---|---|
| HIGH (> 100 MPH) | S(TARGET) >= S(SOURCE) – 3 dB | S(TARGET) >= S(SOURCE) + 3 dB |
| MEDIUM (30-100 MPH) | S(TARGET) >= S(SOURCE) | S(TARGET) >= S(SOURCE) + 3 dB |
| LOW (0-30 MPH) | S(TARGET) >= S(SOURCE) + 3 dB | S(TARGET) >= S(SOURCE) + 3 dB |

SYSTEMS AND METHODS FOR HANDOVER FOR MOBILE INTEGRATED ACCESS AND BACKHAUL NODES

BACKGROUND INFORMATION

To satisfy the needs and demands of users of mobile communication devices, providers of wireless communication services continue to improve and expand available services and networks used to deliver such services. Such improvements include the development of access to wireless communication services in different environments under different conditions. One aspect of such improvements involves providing access to wireless communication services for customers of mass transit. Managing access to wireless communication services in mass transit situations poses various challenges.

DETAILED DESCRIPTION OF EXAMPLE EMBODIMENTS

The following detailed description refers to the accompanying drawings. The same reference numbers in different drawings identify the same or similar elements.

A feature of next generation cellular wireless network, such as, for example, a Fifth Generation (5G) network, is the use of high frequency bands, and/or lower frequency bands such as Sub 6 Gigahertz (GHz), as well as a large number of antennas. 5G New Radio (NR) millimeter (mm) wave technology may provide significant improvements in bandwidth and/or latency over other wireless network technology However, wireless signals at the mm wave frequency range used by 5G may have poor multipath propagation and fading as a result of scattering from terrain objects, such as buildings, foliage, mountains, vehicles, etc.; reflection from bodies of water; ionospheric reflection and/or refraction; atmospheric attenuation and scattering caused by air masses of different densities, wind, precipitation, etc.; and/or other types of signal interference. Therefore, 5G NR mm wave communications may require line of sight (LOS) transmission to minimize signal degradation. Thus, in order to provide effective coverage, a large number of 5G mm wave base stations may need to be deployed in an area.

A way to reduce the cost of deployment of base stations in an area is to employ an approach in which some base stations are connected to the network using a wired backhaul (e.g., an optical fiber connection, etc.), while other base stations connect to these base stations using a wireless backhaul link. Base stations with a wired backhaul may be referred to as donor or parent nodes, while base stations with a wireless backhaul may be referred to as Integrated Access and Backhaul (IAB) nodes.

An application of IAB nodes is in mass transit situations or public transportation, such as on high-speed trains, metro trains, buses, airplanes, ferries, and/or other types of mass transit vehicles. An IAB node located on a mass transit vehicle may be mobile and referred to as a mobile IAB (M-IAB) node. The user equipment (UE) devices of passengers on the mass transit vehicle may attach to the M-IAB node in order to access wireless communication services. Since an M-IAB node is mobile, a source parent node may need to handover the wireless backhaul link of the M-IAB node to a target parent node as the mass transit vehicle, on which the M-IAB node is located, travels along a trajectory. In order to deliver a high Quality of Experience (QoE) to UE devices attached to the M-IAB node, a provider of wireless communication services may need to support fast, reliable, and smooth handovers between parent nodes of an M-IAB node.

Implementations described herein relate to systems and methods for speedy parent handovers for M-IAB nodes. An M-IAB device may have a predetermined trajectory or path and parent nodes along the trajectory/path may be configured to prepare for a handover and then perform the handover based on a set of triggering conditions.

For example, a source parent node along a trajectory of an M-IAB node may receive information relating to the trajectory of the M-IAB node and generate a neighbor parent list of base stations for the M-IAB node based on the received information. Furthermore, the source parent node may determine a first triggering condition for preparing a handover and a second triggering condition for initiating the handover. The triggering conditions may be based on, for example, a difference between signal strengths of the source parent node and the target parent node as measured by the M-IAB node. Furthermore, the triggering conditions may be based on the speed of the M-IAB node. Additionally, the source parent mode may determine contention-less Random Access Channel (RACH) information for a target parent node.

The source parent node may be configured to establish a backhaul link for an M-IAB node and provide configuration data to the M-IAB node, in response to establishing the backhaul link. The configuration data may include, for example, the neighbor parent list for the M-IAB node; a set of triggering conditions that includes the first triggering condition and the second triggering condition; RACH information for the target parent node, and/or other types of configuration data. The configuration data may cause the M-IAB node to report when a triggering condition for initiating preparation of a handover to a target parent node is satisfied. The source parent node may be further configured to detect that the triggering condition is satisfied and send a request to the target parent node to prepare the handover, in response to detecting that the triggering condition is satisfied.

The request to prepare the handover may instruct the target parent node to perform admission control for the M-IAB base station. Furthermore, the request to prepare the handover may instruct the target parent node to set up a communication tunnel to one or more User Plane Function (UPF) devices processing data traffic for the M-IAB base station. In response, the target parent node may perform admission control for the M-IAB node and set up communication tunnels to the one or more UPF devices before the handover to the target parent node is performed. Additionally, the source parent node may set up early data forwarding for communication sessions associated with the M-IAB base station. For example, the source parent node may forward downlink data for UE devices attached to the M-IAB node to the target parent node.

When the M-IAB node detects the second triggering condition for initiating the handover, the M-IAB node may send a handover request to the target parent node and the target parent node may perform the handover and create a backhaul link for the M-IAB node. The target parent node may then send a message to the source parent node indicating that the handover for the M-IAB base station was successfully completed and the source parent node may release the backhaul link for the M-IAB node in response.

Preparing a handover for a wireless backhaul link of an M-IAB node, as the M-IAB node moves away from a source parent node, to which the wireless backhaul link is connected, to a target parent node, may result in more efficient use of network resources, speed up a handover for a fast moving M-IAB node, and/or result in fewer disruptions to user experience.

Figure 1:
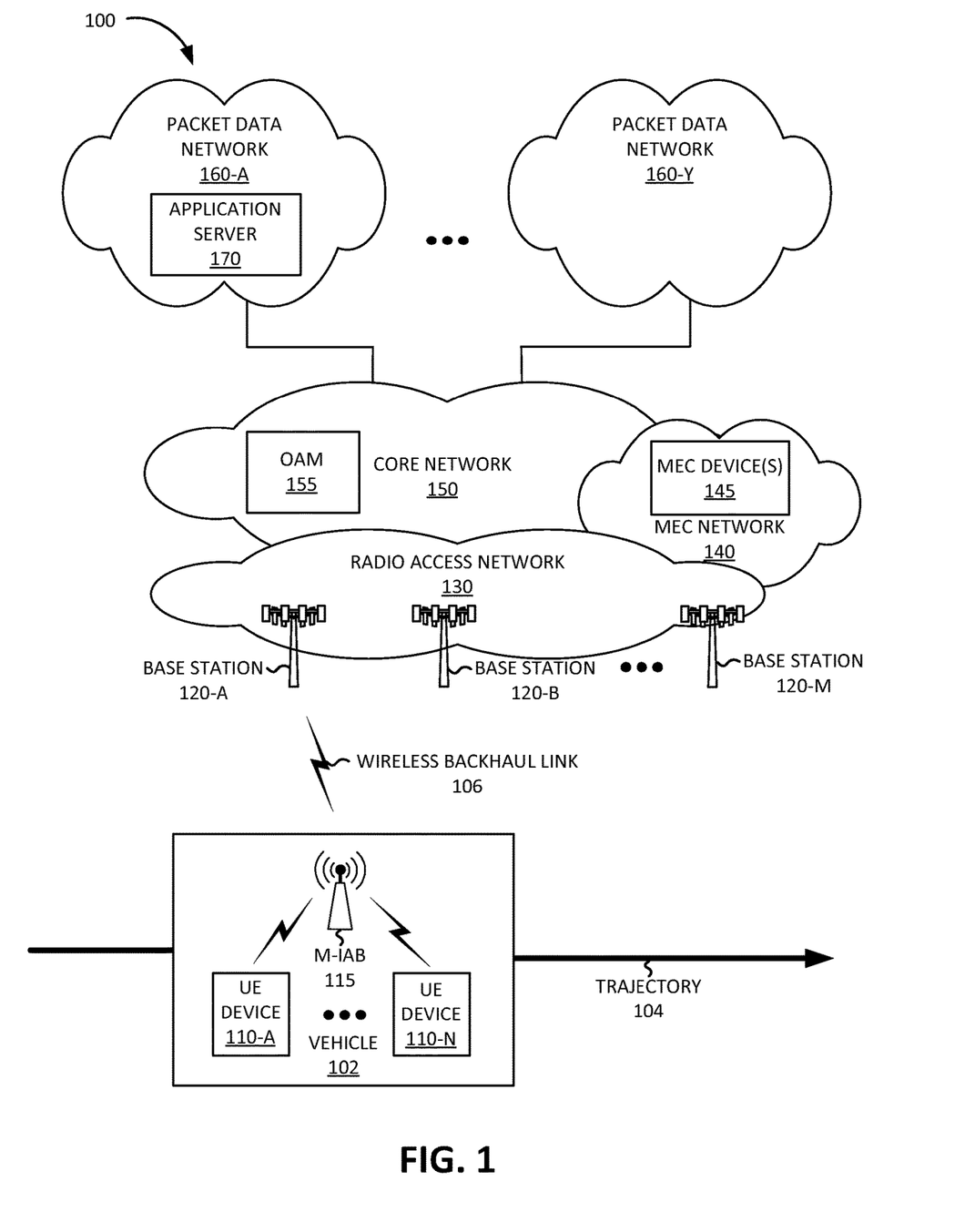
FIG. 1 illustrates an environment according to an implementation described herein.

FIG. 1 is a diagram of an exemplary environment 100 in which the systems and/or methods described herein may be implemented. As shown in FIG. 1, environment 100 may include a vehicle 102 on a trajectory 104, UE devices 110-A to 110-N (referred to herein collectively as "UE devices 110" and individually as "UE device 110") and M-IAB device 115 on vehicle 102, Radio Access Network (RAN) 130 that includes base stations 120-A to 120-M (referred to herein collectively as "base stations 120" and individually as "base station 120"), MEC network 140, core network 150, and packet data networks (PDNs) 160-A to 160-Y (referred to herein collectively as "PDNs 160" and individually as "PDN 160").

Vehicle 102 may include a mass transit vehicle on a predetermined trajectory 104. Trajectory 104 of vehicle 102 may include a predetermined route/path of vehicle 102 through a set of geographic locations. Vehicle 102 may include a high-speed train, an above-ground or underground metro train, a bus, a ferry, an airplane, and/or another type of mass transit vehicle. UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; and/or any other type of computer device with wireless communication capabilities and a user interface. In some implementations, UE device 110 may communicate using machine-to-machine (M2M) communication, such as Machine Type Communication (MTC), and/or another type of M2M communication for Internet of Things (IoT) applications. UE device 110 may include capabilities for voice communication, mobile broadband services (e.g., video streaming, real-time gaming, premium Internet access etc.), best effort data traffic, and/or other types of applications.

M-IAB device 115 may include a base station configured for one or more Radio Access Technology (RAT) types. For example, M-IAB device 115 may include a 5G New Radio (NR) base station (e.g., a gNodeB) and/or a Fourth Generation (4G) Long Term Evolution (LTE) base station (e.g., an eNodeB). M-IAB device 115 may include devices and/or components that enable cellular wireless communication with UE devices 110. For example, M-IAB device 115 may include a radio frequency (RF) transceiver configured to communicate with UE devices 110 using a 5G NR air interface, a 4G LTE air interface, and/or using another type of cellular air interface. Furthermore, M-IAB device 115 may establish a wireless backhaul link 106 with base station 120. Wireless backhaul link 106 may enable UE devices 110 to connect to core network 150 via RAN 130.

RAN 130 may include base stations 120 (e.g., base stations 120-A, 120-B . . . 120-M, etc.). Base station 120 may be configured for one or more RAT types. For example, base station 120 may include a 5G NR base station (e.g., a gNodeB) and/or a 4G LTE base station (e.g., an eNodeB) as described above with respect to M-IAB device 115. Base station 120 may establish and maintain a wireless backhaul link for M-IAB device 115 and prepare and process a handover to another base station 120 based on a set of triggering conditions. For example, a first base station 120 may prepare a handover of wireless backhaul link 106 to a second base station 120 (e.g., from base station 120-A to base station 120-B, etc.), and then perform the handover, as vehicle 102 moves along trajectory 104.

MEC network 140 may be associated with one or more base stations 120 and may provide MEC services for UE devices 110 attached to the base stations 120. MEC network 140 may be in proximity to base stations 120 from a geographic and network topology perspective, thus enabling low latency communication with UE devices 110 and/or base stations 120. As an example, MEC network 140 may be located on the same site as base station 120. As another example, MEC network 140 may be geographically closer to one of base stations 120 and reachable via fewer network hops and/or fewer switches, than other base stations 120.

MEC network 140 may include one or more MEC devices 145. MEC devices 145 may provide MEC services to UE device 110. A MEC service may include, for example, a low-latency service associated with a particular application, such as, for example, a computer vision application to detect particular types of objects, a collision detection application to detect obstacles and/or the presence of other aerial vehicles, etc. As another example, a MEC service may include a microservice associated with a virtualized network function (VNF) of core network 150. As yet another example, in some implementations, a MEC service may include an Operations, Administration, and Maintenance (OAM) service as described below with reference to OAM system 155.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. Exemplary components of a 5G core network are described below with reference to FIG. 2. In some implementations, core network 150 may also include a 4G core network (e.g., an evolved packet core (EPC) network) and/or another type of core network.

The components of core network 150 may be implemented as dedicated hardware components or as virtualized functions implemented on top of a common shared physical infrastructure using software defined networking (SDN). For example, an SDN controller may implement one or more of the components of core network 150 using an adapter implementing a virtual network function (VNF) virtual machine, a Cloud Native Function (CNF) container, an event driven serverless architecture interface, and/or another type of SDN component. The common shared physical infrastructure may be implemented using one or more devices 300 described below with reference to FIG. 3 in a cloud computing center associated with core network 150. Additionally, or alternatively, some, or all, of the shared physical infrastructure may be implemented using one or more devices 300 implemented in MEC device 145 in MEC network 140.

Core network 150 may include an OAM system 155. OAM system 155 may perform OAM functions for core network 150 and/or RAN 130. Furthermore, OAM system 155 may store and maintain trajectory information for trajectories 104 of M-IAB devices 115. The trajectory information may include a set of locations and times at which M-IAB device 115 is expected to be at each location, an expected speed of M-IAB device 115, expected stops made by M-IAB device 115, and/or other types of trajectory information. Furthermore, OAM system 155 may store information identifying the location and/or coverage area of base stations 120. OAM system 155 may generate a neighbor parent list of base stations 120 for M-IAB 115 based on the trajectory information and the location and/or coverage information for base stations 120. Alternatively, OAM system 155 may provide the trajectory information to a parent node base station 120 for M-IAB 115 and the parent node base station 120 may determine the neighbor parent list for M-IAB 115.

PDNs 160-A to 160-Y may each include a PDN. A particular PDN 160 may be associated with a Data Network Name (DNN) in 5G, and/or an Access Point Name (APN) in 4G. UE device 110 may request a connection to PDN 160 using a DNN or an APN. PDN 160 may include, and/or be connected to, a local area network (LAN), a wide area network (WAN), a metropolitan area network (MAN), an autonomous system (AS) on the Internet, an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks.

PDN 160 may include an application server 170 (shown in PDN 160-A in FIG. 1 for illustrative purposes). Application server 170 may provide services for an application running on UE device 110 and may establish an application session with UE device 110 via RAN 130 and core network 150.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
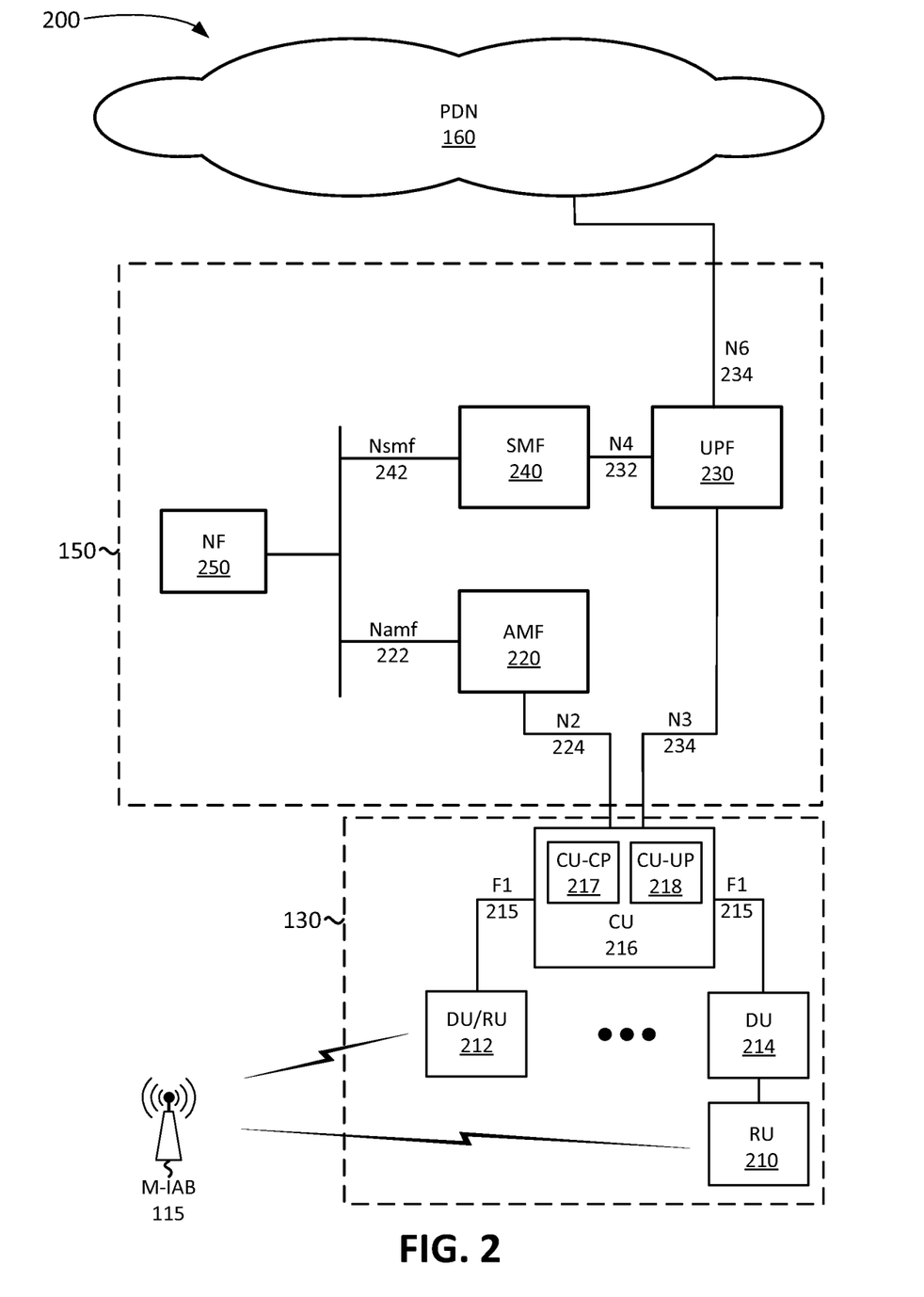
FIG. 2 is a diagram illustrating exemplary components of a Fifth Generation (5G) core network according to an implementation described herein.

FIG. 2 illustrates a system 200 that includes exemplary components of core network 150 and RAN 130 in the context of environment 100 according to an implementation described herein. As shown in FIG. 2, system 200 may include M-IAB device 115, RAN 130, core network 150, and PDN 160.

RAN 130 may include a radio unit (RU) 210, a combination RU and distributed unit (DU) 212, a DU 214, and a central unit 216. While a single RU 210, DU/RU 212, DU 214, and CU 216 are shown for illustrative purposes, in practice, RAN 130 may include multiple RUs 210, multiple DU/RUs 212, multiple DUs 214, and/or multiple CUs 216. RU 210 may include an RF transceiver with one or more antenna arrays. DU 214 may include a logical node that includes lower-level functionality for processing (e.g., Layer 2 and/or Layer 1 processing) for base station 120 (e.g., a gNodeB), including, for example, functionality to generate and/or process Radio Link Control (RLC) messages, Medium Access Control (MAC) messages, and/or physical (PHY) layer messages. DU 214 may support multiple RUs 210. RU 210 and/or DU/RU 212 may each function as a parent node to M-IAB 115 and establish and maintain a wireless backhaul link for M-IAB 115. Thus, RU 210 and/or DU/RU 212 may each function as a gNodeB that enables UE devices 110 to connect to core network 150.

CU 216 may include a logical node that includes the functionality for control flow processing for base station 120, including, for example, the functionality to generate and/or process Radio Resource Control (RRC) protocol messages, Service Data Adaptation Protocol (SDAP) messages, and/or Packet Data Convergence Protocol (PDCP) messages. CU 216 may include a CU Control Plane (CU-CP) 217 and a CU User Plane (CU-UP) 218. CU-CP 217 may perform control plane processing for CU 216 and may control one or more DUs 214 and/or DU/RUs 212. CU-UP 218 may perform data plane processing for CU 216, such as forwarding and/or routing messages between DUs 214 and/or DU/RUs 212 and core network 150 (e.g., UPF 230). CU-CP 217 may set up Protocol Data Unit (PDU) sessions in DU 214, DU/RUs 212, and CU-UP 218. CU 216 may terminate an F1 interface 215 with DU 214 and/or DU/RUs 212, may communicate with AMF 220 using an N2 interface 224 and communicate with UPF 230 using an N3 interface 234. CU-CP 217 may receive information relating to trajectory 104 of M-IAB device 115 from OAM system 155 and may generate a neighbor parent list for M-IAB device 115 and provide the generated neighbor parent list to RU 210, DU/RU 212, and/or DU 214. Alternatively, RU 210, DU/RU 212, and/or DU 214 may generate the neighbor parent list based on trajectory information received from CU-CP 217.

Core network 150 may include an Access and Mobility Function (AMF) 220, a User Plane Function (UPF) 230, a Session Management Function (SMF) 240, and one or more additional network functions (NFs) 250. While FIG. 2 depicts a single AMF 220, UPF 230, SMF 240, and NF 250, for illustrative purposes, in practice, core network 150 may include multiple AMFs 220, UPFs 230, SMFs 240, and/or NFs 250.

AMF 220 may perform registration management, connection management, reachability management, mobility management, lawful intercepts, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external PDU point of interconnect to a particular data network (e.g., PDN 160), perform packet routing and forwarding, perform the user plane part of policy rule enforcement, perform packet inspection, perform lawful intercept, perform traffic usage reporting, perform Quality of Service (QoS) handling in the user plane, perform uplink traffic verification, perform transport level packet marking, perform downlink packet buffering, forward an "end marker" to a gNodeB, and/or perform other types of user plane processes. UPF 230 may communicate with SMF 240 using an N4 interface 232 and connect to PDN 160 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, perform lawful intercepts, charge data collection, support charging interfaces, control and coordinate charging data collection, terminate session management parts of Non-Access Stratum (NAS) messages, perform downlink data notification, manage roaming, and/or perform other types of control plane processes for managing user plane data. SMF 240 may be accessible via an Nsmf interface 242.

NF 250 may include an Application Function (AF) configured to provide services associated with a particular application; a Unified Data Management (UDM) configured to maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, and/or perform other processes associated with managing user data; a Policy Control Function (PCF) configured to support policies to control network behavior, provide policy rules to control plane functions (e.g., to SMF 240), access subscription information relevant to policy decisions, perform policy decisions, and/or perform other types of processes associated with policy enforcement; a Charging Function (CHF) configured to perform charging and/or billing functions for core network 150; a Network Repository Function (NRF) configured to support a service discovery function and maintain profiles of available NF instances and their supported services; a Network Exposure Function (NEF) configured to expose capabilities and events to other NFs, including third party NFs, AFs, edge computing NFs, and/or other types of NFs; a Network Slice Selection Function (NSSF) configured to select a set of network slice instances to serve a particular UE device 110, determine network slice selection assistance information (NSSAI) or a Single-NSSAI (S-NSSA), determine a particular AMF 220 to serve a particular UE device 110, and/or perform other types of processing associated with network slice selection or management; an Authentication Server Function (AUSF) configured to perform authentication by, for example, implementing an Extensible Authentication Protocol (EAP) authentication server and storing authentication keys for UE devices 110; a 5G Equipment Identity Register (EIR) configured to authenticate a particular UE device 110 based on UE device identity, such as a Permanent Equipment Identifier (PEI); an Network Data Analytics Function (NWDAF) configured to collect analytics information associated with RAN 130 and/or core network 150; a Non-3GPP Inter-Working Function (N3IWF) configured to interconnect to a non-3GPP access device, such as, for example, a WiFi Access Point; and/or other types of 5G NFs.

A parent node, such as RU 210 and/or DU/RU 212, which maintains a wireless backhaul link for M-IAB device 115, may establish a communication tunnel to PDN 160 via UPF 230. For example, each UE device 110 attached to M-IAB 115 may be associated with a PDU session to PDN 160 via UPF 230. When a source parent node prepares a handover to a target parent node, the source parent node may instruct the target parent node to set up PDU sessions for UE devices 110 attached to M-IAB 115. Furthermore, the source parent node may forward downlink data for UE devices 110 received via the PDU sessions to the target parent node to be forwarded via the target parent node to UE devices 110 after the handover is performed.

Although FIG. 2 shows exemplary components of system 200, in other implementations, system 200 may include fewer components, different components, differently arranged components, or additional components than depicted in FIG. 2. Additionally, or alternatively, one or more components of system 200 may perform functions described as being performed by one or more other components of system 200.

Figure 3:
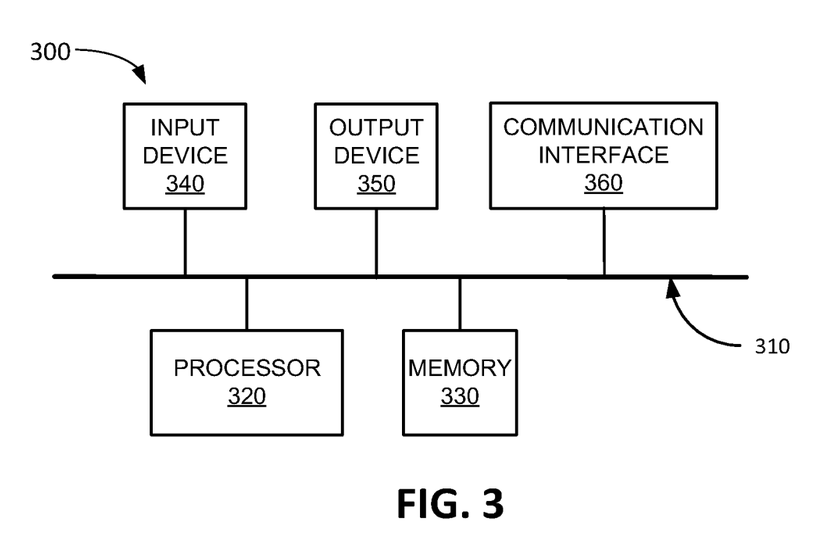
FIG. 3 illustrates exemplary components of a device that may be included in a component of an environment according to an implementation described herein.

FIG. 3 illustrates example components of a device 300 according to an implementation described herein. UE device 110, M-IAB device 115, base station 120, MEC device 145, OAM system 155, application server 170, RU 210, DU/RU 212, DU 214, CU 216, AMF 220, UPF 230, SMF 240, and/or NF 250 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, in an implementation, device 300 may perform certain operations relating to preparing and/or performing handovers for an M-IAB device. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
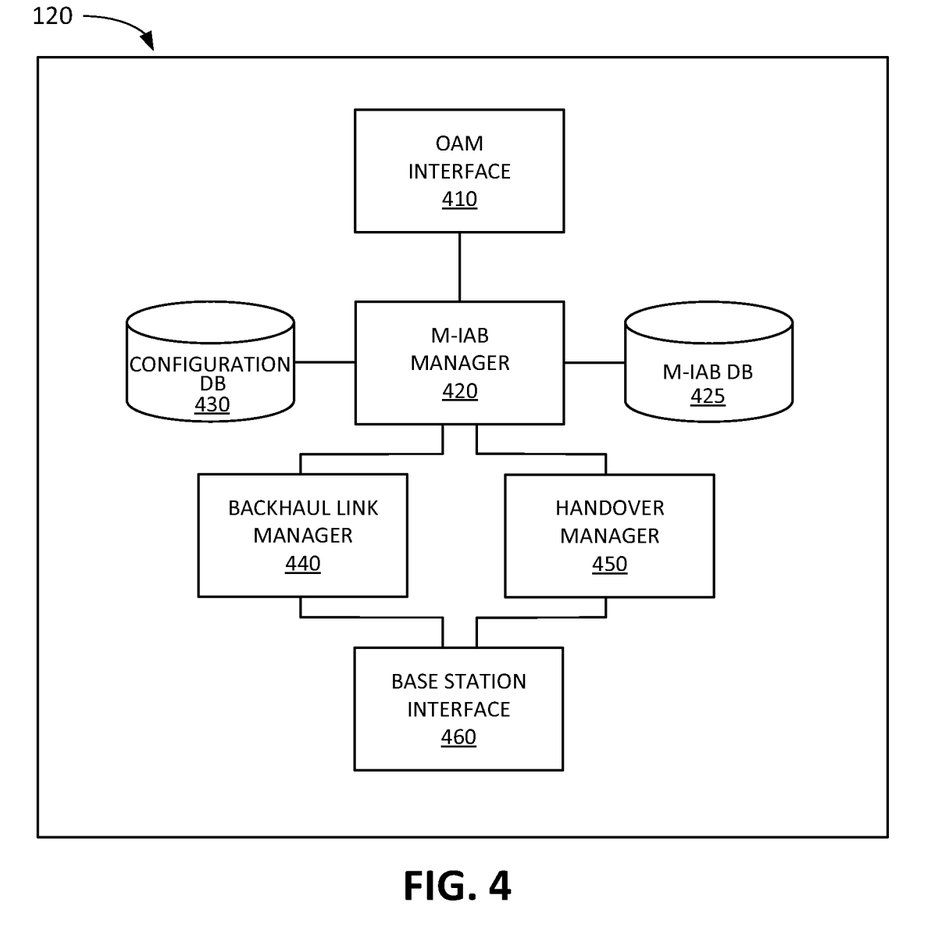
FIG. 4 illustrates exemplary components of a base station according to an implementation described herein.

FIG. 4 is a diagram illustrating exemplary components of base station 120. The components of base station 120 may be implemented, for example, via processor 320 executing instructions from memory 330. Alternatively, some or all of the components of base station 120 may be implemented via hard-wired circuitry. As shown in FIG. 4, base station 120 may include an OAM interface 410, an M-IAB manager 420, a M-IAB database (DB) 425, a configuration (config) DB 430, a backhaul link manager 440, a handover manager 450, and a base station interface 460.

OAM interface 410 may be configured to communicate with OAM system 155. For example, OAM interface 410 may receive information relating to trajectory 104 of M-IAB device 115 from OAM system 155. M-IAB manager 420 may manage M-IAB devices 115 associated with RAN 130 based on information stored in M-IAB DB 425 and/or configuration DB 430. M-IAB DB 425 may store information relating to particular M-IAB devices 115 associated with RAN 130. Exemplary information that may be stored in M-IAB DB 425 is described below with reference to FIG. 5. Configuration DB 430 may store configuration data for triggering conditions for preparing and performing a handover. Exemplary information that may be stored in configuration DB 430 is described below with reference to FIG. 6.

M-IAB manager 420 may establish, maintain, and/or release wireless backhaul link 106 for M-IAB device 115 using backhaul link manager 440. Backhaul link manager 440 may reserve resources for establishing wireless backhaul link 106 and may release resources associated with wireless backhaul link 106 when wireless backhaul link 106 is handed over to another parent node.

M-IAB manager 420 may prepare and/or perform a handover of wireless backhaul link 106 for M-IAB device 115 using handover manager 450. As an example, handover manager 450 may determine that a triggering condition for handover preparation has been reached and send a request to a target parent node to prepare a handover. Handover manager 450 may then establish early user data forwarding to the target parent node. As another example, handover manager 450 may receive a request to prepare a handover of wireless backhaul link 106 of M-IAB device 115 from a source parent node and may, in response, perform admission control and early user data link setup for M-IAB device 115. Furthermore, handover manager 450 may receive a request from M-IAB device 115 to perform a handover and may establish wireless backhaul link 106 for M-IAB device 115. Base station interface 460 may be configured to communicate with other base stations 120. For example, base station interface 460 may implement an Xn interface between gNodeBs.

Although FIG. 4 shows exemplary components of base station 120, in other implementations, base station 120 may include fewer components, different components, additional components, or differently arranged components than depicted in FIG. 4. Additionally, or alternatively, one or more components of base station 120 may perform one or more tasks described as being performed by one or more other components of base station 120.

Figure 5:
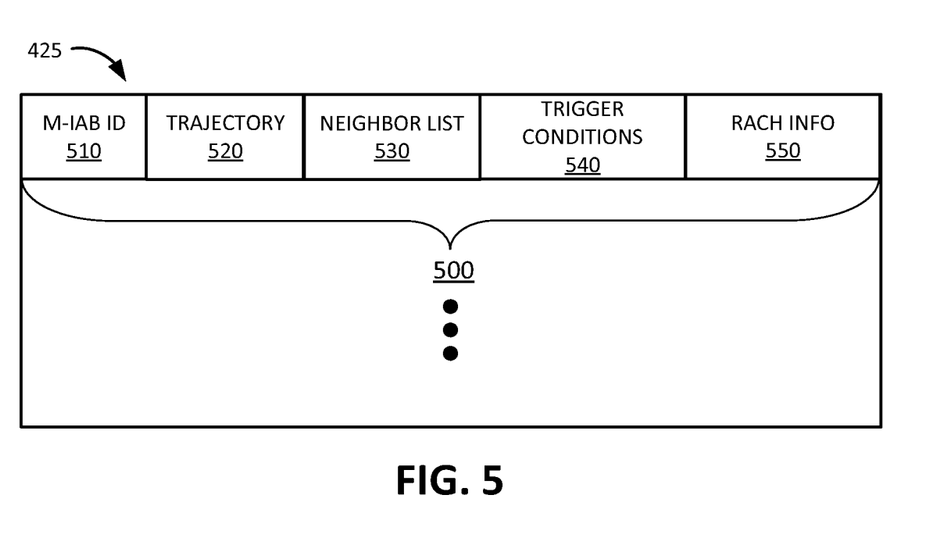
FIG. 5 illustrates exemplary components of a Mobile Integrated Access and Backhaul (M-IAB) database according to an implementation described herein.

FIG. 5 illustrates exemplary components of M-IAB DB 425 according to an implementation described herein. As shown in FIG. 5, M-IAB DB 425 may include one or more M-IAB records 500. Each M-IAB record 500 may store information relating to a particular M-IAB device 115. M-IAB record 500 may include an M-IAB identifier (ID) field 510, a trajectory field 520, a neighbor list field 530, a trigger conditions field 540, and a RACH information field 550.

M-IAB ID field 510 may store information identifying a particular M-IAB device 115. Trajectory field 520 may store information for trajectory 104 of the particular M-IAB device 115, such as, for example, a set of locations and times at which M-IAB device 115 is expected to be at each location, an expected speed of M-IAB device 115, expected stops made by M-IAB device 115, and/or other types of trajectory information.

Neighbor list field 530 may store a list of neighbor parent nodes for the particular M-IAB device 115. The list of neighbor parent nodes may identify a set of base stations 120, locations for the set of base stations 120, cells or sectors of each base station 120 in the set, RAT types for each base station 120 in the set, bands and/or channels for each base station 120 in the set, and/or other types of information associated with base stations 120.

Trigger conditions field 540 may store a set of trigger conditions selected from configuration DB 430, such as a trigger condition for preparing a handover and a trigger condition for performing a handover. RACH information field 550 may store contention-less RACH information for base stations 120 in the neighbor parent list. The contention-less RACH information may include, for example, a signal sequence (e.g., a Zadoff Chu sequence, etc.), antenna beam, timing, and frequency information for establishing a connection to a particular neighbor node base station 120 on a contention-less RACH.

Although FIG. 5 shows exemplary components of M-IAB DB 425, in other implementations, M-IAB DB 425 may include fewer components, different components, additional components, or differently arranged components than depicted in FIG. 5.

Figure 6:
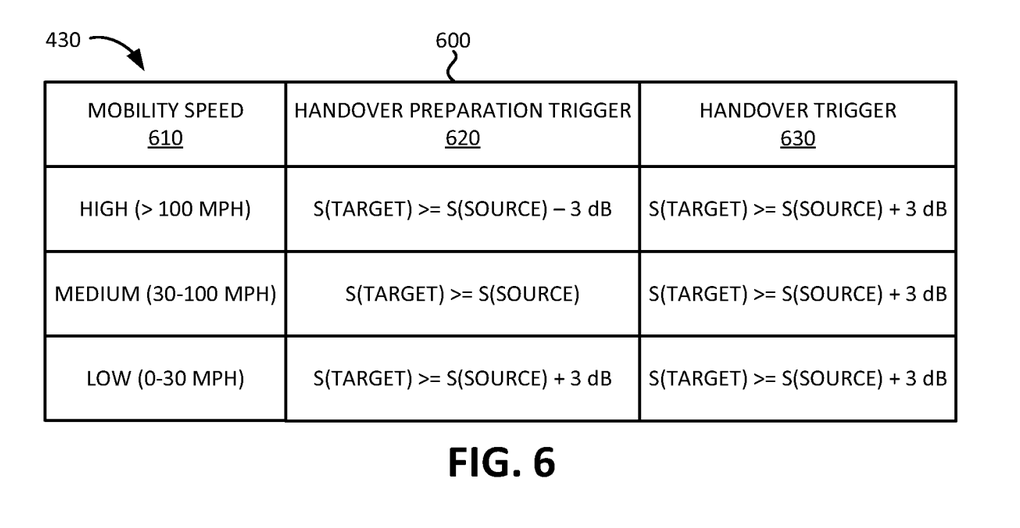
FIG. 6 illustrates exemplary components of a configuration database according to an implementation described herein.

FIG. 6 illustrates exemplary components of configuration DB 430 according to an implementation described herein. As shown in FIG. 6, configuration DB 430 may include a configuration table 600. Configuration table 600 may specify handover preparation triggers and handover triggers for different mobility speeds of M-IAB device 115. As shown in FIG. 6, configuration table 600 may include a mobility speed column 610, a handover preparation trigger column 620, and a handover trigger column 630. Each entry in mobility speed column 610 may specify a particular range of speeds for M-IAB device 115. For example, mobility speed column 610 may include a low speed entry (e.g., device movement speeds below 30 miles per hour (mph); a medium speed entry (e.g., device movement speeds between 30 and 100 mph); and a high speed entry (e.g., device movement speeds above 100 mph).

Each entry in handover preparation trigger column 620 may store a handover preparation trigger for preparing a handover from a source parent node to a target parent node. For example, handover preparation trigger column 620 may store a handover preparation trigger for high speeds corresponding to a signal strength of the target parent node being greater than or equal to the signal strength of source parent node minus 3 decibels (dB), as measured by M-IAB device 115; a handover preparation trigger for medium speeds corresponding to the signal strength of the target parent node being substantially equal to the source parent node, as measured by M-IAB device 115; and a handover preparation trigger for low speeds corresponding to a signal strength of the target parent node being greater than or equal to the signal strength of source parent node plus 3 dB, as measured by M-IAB device 115.

Each entry in handover trigger column 630 may store a handover trigger for performing a handover from a source parent node to a target parent node. For example, handover trigger column 630 may store a handover trigger for high speeds corresponding to a signal strength of the target parent node being greater than or equal to the signal strength of source parent node plus 3 dB, as measured by M-IAB device 115; a handover trigger for medium speeds corresponding to a signal strength of the target parent node being greater than or equal to the signal strength of source parent node, as measured by M-IAB device 115; and a handover trigger for low speeds corresponding to a signal strength of the target parent node being greater than or equal to the signal strength of source parent node plus 3 dB, as measured by M-IAB device 115.

Although FIG. 6 shows exemplary components of configuration DB 430, in other implementations, configuration DB 430 may include fewer components, different components, additional components, or differently arranged components than depicted in FIG. 6. As an example, configuration table 600 may include different values of handover preparation triggers 620 and/or handover triggers 630. As another example, configuration table 600 may include fewer, additional, or different entries for movement speeds 610 of M-IAB device 115.

Figure 7:
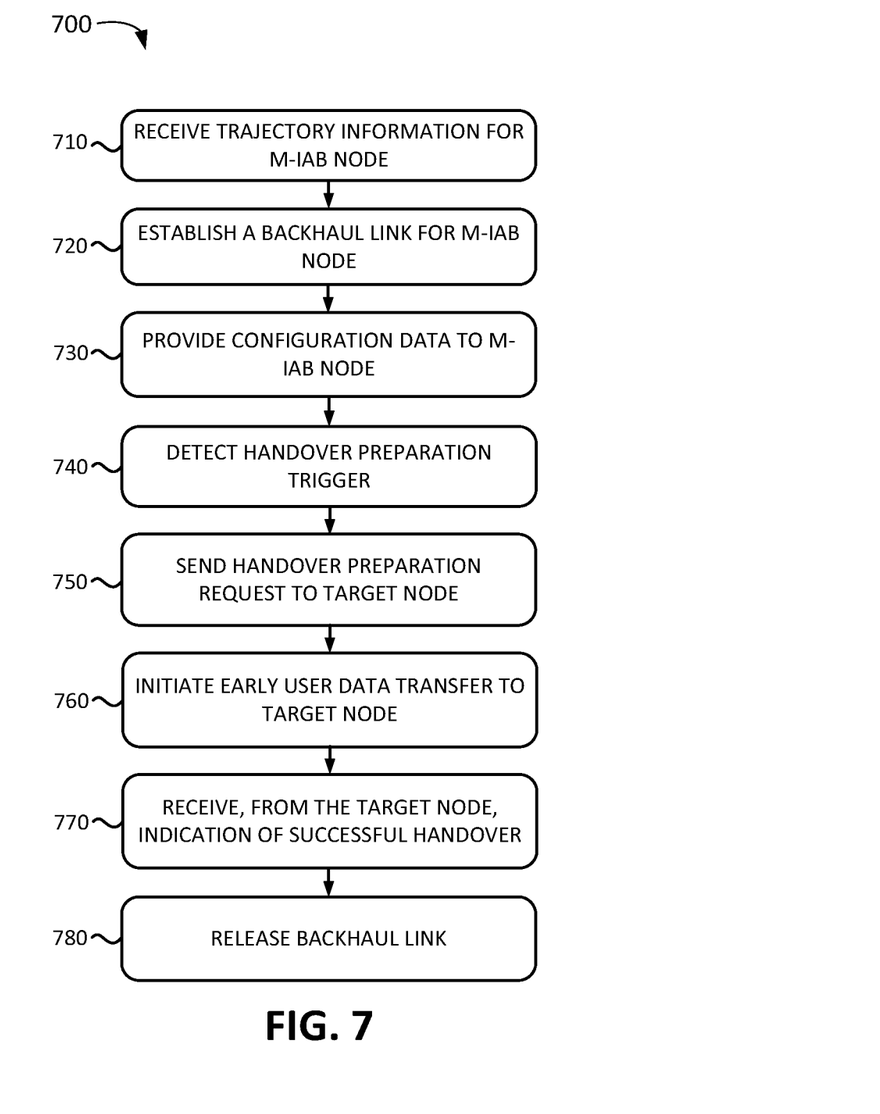
FIG. 7 illustrates a flowchart for preparing a handover according to an implementation described herein.

FIG. 7 illustrates a flowchart of a process 700 for preparing a handover according to an implementation described herein. In some implementations, process 700 of FIG. 7 may be performed by base station 120. In other implementations, some or all of process 700 may be performed by another device or a group of devices.

As shown in FIG. 7, process 700 may include receiving trajectory information for an M-IAB node (block 710). As an example, base station 120 may receive trajectory information for M-IAB device 115 from OAM system 155 and may generate a neighbor parent list based on location and/or coverage information for other base stations 120 on the neighbor list of base station 120. For example, base station 120 may remove neighbor nodes from its neighbor list that are not in the coverage area of trajectory 104. As another example, OAM system 155 may generate the neighbor parent list for M-IAB device 115 and provide the generated neighbor list to base station 120.

Process 700 may further include establishing a backhaul link for the M-IAB node (block 720) and providing configuration data to the M-IAB node (block 730). For example, base station 120 may receive a handover request from M-IAB device 115 and may, in response, establish wireless backhaul link 106 for M-IAB device 115. Base station 120 may then send an RRC reconfiguration message to M-IAB device 115 with configuration data for preparing and/or performing a handover. The configuration data may include the neighbor parent list for M-IAB device 115, a set of triggering conditions for preparing a handover and for performing a handover, contention-less RACH information for a target parent node, and/or other type of configuration data.

Process 700 may further include detecting a handover preparation trigger (block 740) and sending a handover preparation request to a target node (block 750). As an example, base station 120 may receive an indication from M-IAB device 115 that M-IAB device 115 has detected a triggering condition for preparing a handover. As another example, base station 120 may receive a measurement report from M-IAB device 115 and may detect, based on measurements of signal strengths for different neighbor nodes in the received measurement report, a triggering condition for preparing a handover. In response, base station 120 may send a request to prepare a handover for the wireless backhaul link of M-IAB device 115 to a target parent node corresponding to another base station 120 from the neighbor parent list identified by M-IAB device 115.

The target parent node may perform admission control to authenticate M-IAB device 115 and send an acknowledgement of the handover preparation request back to base station 120. In some implementations, the target parent node may include contention-less RACH information in the acknowledgement message and base station 120 may forward the contention-less RACH information to M-IAB device 115. The target parent node may also perform an early user data link setup for M-IAB device 115 by establishing a communication tunnel to each UPF 230 with which UE devices 110 have a PDU session established. Thus, when the handover is performed, the target parent node may not need to spend time and resources establishing the communication tunnel, resulting in a faster handover. In some implementations, base station 120 may provide a list of UPFs 230, with which PDU sessions are established via M-IAB device 115, to the target parent node so that the target parent node is able to establish a communication tunnel with each UPF 230 managing a PDU session for UE devices 110 attached to M-IAB device 115.

Process 700 may further include initiating early user data transfer to a target node (block 760). For example, base station 120 may forward downlink traffic destined for UE devices 110 attached to M-IAB device 115 from one or more UPFs 230 to the target parent node over an Xn interface. The target parent node may store the forwarded downlink traffic in a buffer until a handover is performed for M-IAB device 115. Base station 120 may continue to also forward the downlink traffic via wireless backhaul link 106 while wireless backhaul link 106 is active and until a handover is performed. The target parent node may determine which downlink traffic PDUs need to be forwarded after the handover is performed based on, for example, time of arrival timestamps associated with the PDUs in comparison with a time at which the handover was initiated, based on retransmission requests received from UE devices 110 attached to M-IAB device 115, and/or based on other criteria. Thus, when the handover is performed, RAN 130 may take less time to deliver downlink traffic to UE devices 110 attached to M-IAB device 115, resulting in a better user experience.

Process 700 may further include receiving, from the target node, an indication of successful handover (block 770) and releasing the backhaul link (block 780). For example, when M-IAB device 115 detects a handover trigger, requests a handover to the target parent node, and the target parent node successfully performs the handover and establishes a wireless backhaul with M-IAB device 115, the target parent node may send a message to base station 120 indicating a successful handover. In response, base station 120 may release the resources for the wireless backhaul link for M-IAB device 115.

Figure 8:
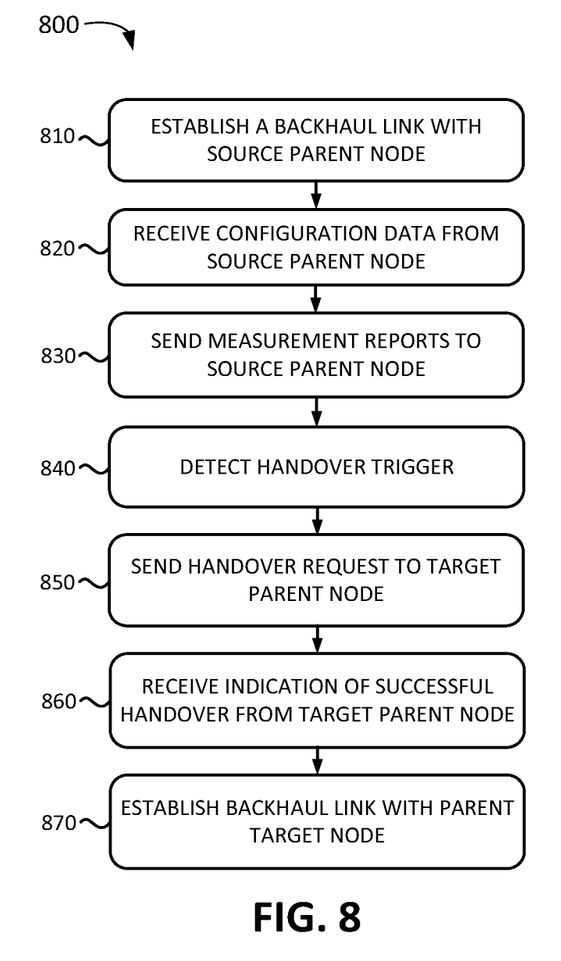
FIG. 8 illustrates a flowchart for performing a handover according to an implementation described herein.

FIG. 8 illustrates a flowchart of a process 800 for performing a handover according to an implementation described herein. In some implementations, process 800 of FIG. 8 may be performed by M-IAB device 115. In other implementations, some or all of process 800 may be performed by another device or a group of devices.

As shown in FIG. 8, process 800 may include establishing a backhaul link with a source parent node (block 810) and receiving configuration data from the source parent node (block 820). For example, M-IAB device 115 may request a handover to a parent node and the parent node may establish wireless backhaul link 106 to M-IAB device 115. M-IAB device 115 may then receive configuration data from the parent node, which includes the neighbor parent list for M-IAB device 115, a set of triggering conditions for preparing a handover and for performing a handover, contention-less RACH information for a target parent node, and/or other type of configuration data.

Process 800 may further include sending measurement reports to the source parent node (block 830). For example, M-IAB device 115 may send measurement reports for base stations 120 on the neighbor parent list to the parent node. The measurement reports may include the measured signal strength for each detected node on the neighbor parent list. In some implementations, M-IAB device 115 may determine whether a handover preparation trigger has been detected by comparing the signal strength for the parent node and other nodes on the neighbor parent list, using the obtained triggering conditions information, and send an indication to the parent node that the handover preparation trigger has been detected. In other implementations, M-IAB device 115 may send the measurement reports to the parent node and the parent node may determine whether a handover preparation trigger has been detected.

Process 800 may further include detecting a handover trigger (block 840) and sending a handover request to a target parent node (block 850). For example, M-IAB device 115 may continue to generate measurement reports and determine whether a handover trigger has been detected by comparing the signal strength for the parent node and other nodes on the neighbor parent list using the obtained triggering conditions information. When a handover trigger is detected, M-IAB device 115 may send a handover request to the target parent node on the neighbor parent list (e.g., the parent node that is associated with the highest detected signal strength, etc.).

Process 800 may further include receiving an indication of a successful handover from the target parent node (block 860) and establishing a backhaul link with the target parent node (block 870). For example, M-IAB device 115 may receive an indication that the handover request has been accepted by the target parent node and may establish a wireless backhaul link to the target parent node and release the resources associated with the wireless backhaul link with the source parent node.

Figure 9:
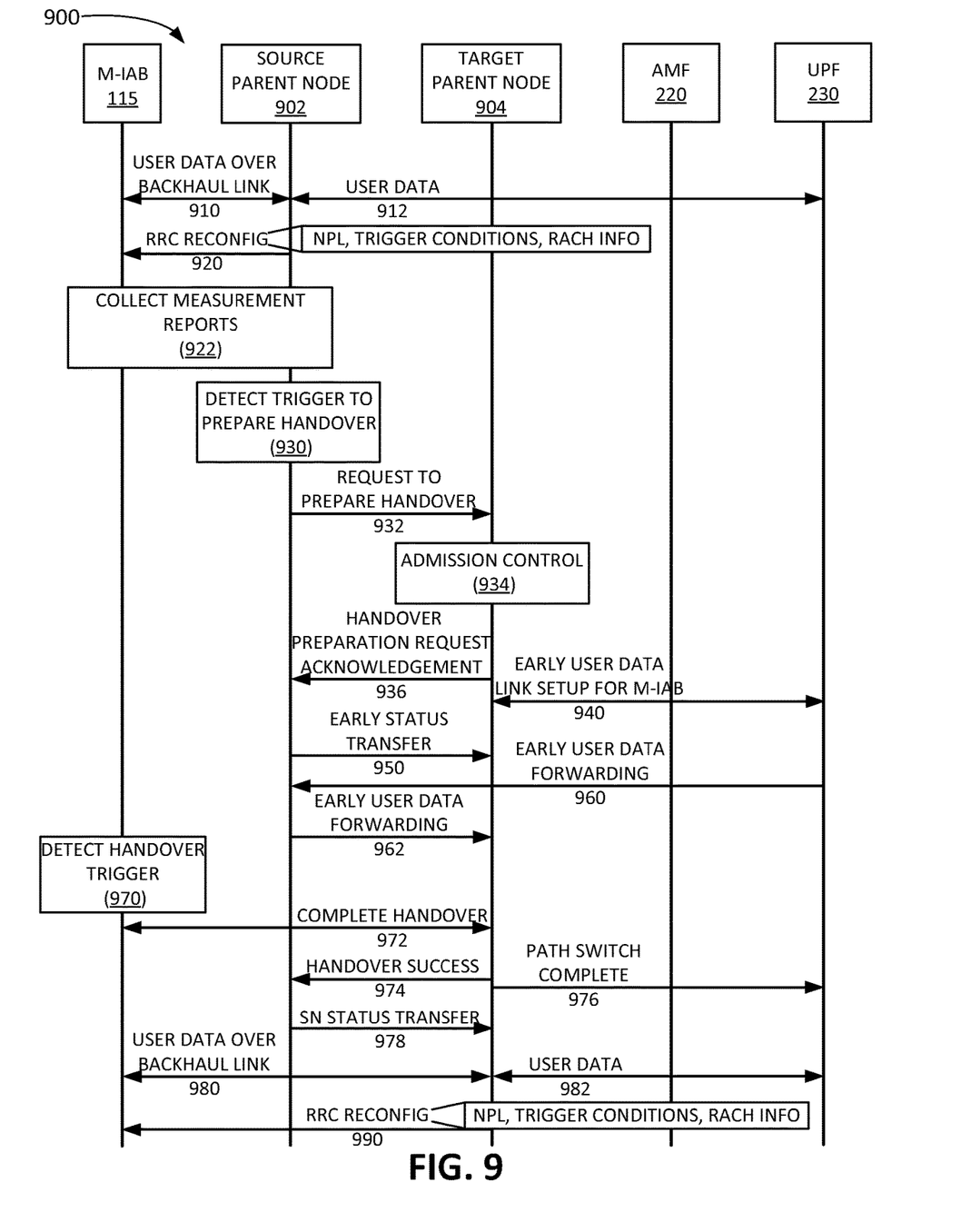
FIG. 9 illustrates an exemplary signal flow according to an implementation described herein.

FIG. 9 illustrates an exemplary signal flow 900 according to an implementation described herein. Signal flow 900 does not necessarily illustrate all signals sent during the process described below. As shown in FIG. 9, signal flow 900 may include M-IAB device 115 establishing a wireless backhaul link with source parent node 902, source parent node 902 establishing a communication tunnel with at least one UPF 230 for UE devices 110 attached to M-IAB device 115, and sending and receiving user data along the wireless backhaul link and communication tunnel for UE devices 110 attached to M-IAB device 115 (signals 910 and 912).

Source parent node 902 may provide configuration data to M-IAB device 115 in an RRC reconfiguration message (signal 920). The RRC reconfiguration message may include configuration data that includes a neighbor parent list for the trajectory of M-IAB device 115, a set of triggering conditions for preparing a handover and for performing a handover, contention-less RACH information for a target parent node, and/or other type of configuration data. In other implementations, the contention-less RACH information may be received from target parent node 904 at a later time and forwarded to M-IAB device 115 (e.g., during handover preparation, etc.).

M-IAB device 115 may then collect measurement reports for parent nodes on the neighbor parent list (block 922). In some implementations, M-IAB device 115 may send an indication to source parent node 902 that a measurement report for target parent node 904 has detected a signal strength that satisfies a handover preparation triggering condition. For example, if M-IAB device 115 is moving at 50 mph and detects that the signal strength for signals received from target parent node 904 is greater than or equal than the signal strength for signals received from source parent node 902, M-IAB device 115 may send an indication to source parent node 902 that a handover preparation triggering condition has been detected (e.g., based on a handover preparation trigger in configuration table 600). In other implementations, M-IAB device 115 may provide measurement report data to source parent node 902 and source parent node 902 may determine whether a handover preparation triggering condition has been detected.

Source parent node 902 may detect a trigger to prepare a handover (e.g., based on an indication received from M-IAB device 115, using a determination made based on a measurement report received from M-IAB device 115, etc.) and send a request to prepare a handover for the wireless backhaul link of M-IAB device 115 to target parent node 904 (block 930 and signal 932). In response, target parent node 904 may prepare for a handover for the wireless backhaul link of M-IAB device 115. Target parent node 904 may perform admission control to authenticate M-IAB device 115. For example, the request from source parent node 902 to prepare the handover may include information identifying M-IAB device 115 and target parent node 904 may use the information identifying M-IAB device 115 to authenticate M-IAB device 115 with a UDM and/or AUSF in core network 150.

Target parent node 904 may send an acknowledgement of the handover preparation request back to source parent node 902 (signal 936). In some implementations, target parent node 904 may include contention-less RACH information in the acknowledgement message and source parent node 902 may forward the contention-less RACH information to M-IAB device 115. Furthermore, target parent node 904 may perform an early user data link setup for M-IAB device 115 (signal 940). For example, target parent node 904 may establish a communication tunnel from DU 214 (or DU/RU 212), associated with target parent node 904, to each UPF 230 with which UE devices 110 have a PDU session established. A set of UPFs 230 with which PDU sessions are established via M-IAB device 115 may be obtained from M-IAB device 115 and provided to target parent node 904 by source parent node 902.

Source parent node 902 may then send an early status transfer message to target parent node 904, indicating that early user data forwarding is to be established (signal 950). Source parent node 902 may then perform early user data forwarding for downlink traffic destined for UE devices 110 attached to M-IAB device 115 by receiving the downlink traffic and forwarding the downlink traffic to target parent node 904 (signals 960 and 962).

At a later time, M-IAB device 115 may detect a triggering condition for requesting a handover to target parent node 904 (block 970) based on the signal strengths measured by M-IAB device 115 for source parent node 902 and target parent node 904. M-IAB device 115 may send a handover request to target parent node 904 using the contention-less RACH information for target parent node 904 received from source parent node 902 and source parent node 902 may perform the handover and establish wireless backhaul link 106 between M-IAB device 115 and target parent node 904 (signal 972). M-IAB device 115 may then release the stored configuration data received from source parent node 902.

Target parent node 904 may send a handover success message to source parent node 902, indicating the handover has been successfully performed (signal 974). Target parent node 904 may also send a path switch complete message to UPF 230, indicating the path for PDU sessions associated with UE devices 110 attached to M-IAB device 115 has been switched to target parent node 904 (signal 976). In response, UPF 230 may forward downlink traffic associated with the PDU sessions to target parent node 904. Furthermore, source parent node 902 may send a source node (SN) status transfer message to target parent node 904 and release the resources for wireless backhaul link 106 for M-IAB device 115 (signal 978).

Once wireless backhaul link 106 for M-IAB device 115 is established via target parent node 904, user data may be received or sent via the communication tunnel from UPF 230 to target parent node 904 and via wireless backhaul link 106 to M-IAB device 115 and then to UE devices 110 attached to M-IAB device 115 (signals 980 and 982). Furthermore, target parent node 904 may now become the source parent node and send an RRC reconfiguration message to M-IAB device 115 with configuration data for the next parent node along trajectory 104 of vehicle 102 (signal 990), repeating the handover preparation process for the next parent node.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signals have been described with respect to FIG. 9, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    establishing, by a device, a backhaul link for a mobile integrated access and backhaul (M-IAB) base station;
    providing, by the device, configuration data to the M-IAB base station, in response to establishing the backhaul link, wherein the configuration data causes the M-IAB base station to report when a first triggering condition, which is selected by the device among a plurality of triggering conditions based on a speed of the M-IAB base station, for preparing a handover to a target parent node is satisfied;
    detecting, by the device, that the first triggering condition is satisfied;
    sending, by the device, a request to the target parent node to prepare the handover, in response to the detecting; and
    performing the handover of the M-IAB base station to the target parent node when a second triggering condition is satisfied, by the device or by the M-IAB base station,
    wherein the second triggering condition is different from the first triggering condition.

2. The method of claim 1, further comprising:
    receiving information relating to a trajectory of the M-IAB base station;
    generating a neighbor parent list of base stations based on the received information; and
    including the generated neighbor parent list in the configuration data provided to the M-IAB base station.

3. The method of claim 1, wherein the first triggering condition specifies a difference between signal strengths of the device and the target parent node, wherein the signal strengths are measured by the M-IAB base station.

4. The method of claim 1, wherein the configuration data includes contention-less random access channel (RACH) information for the target parent node.

5. The method of claim 1, wherein the request instructs the target parent node to perform admission control for the M-IAB base station.

6. The method of claim 1, wherein the request instructs the target parent node to set up a communication tunnel to a User Plane Function (UPF) device processing data traffic for the M-IAB base station.

7. The method of claim 1, further comprising:
    forwarding data for communication sessions associated with the M-IAB base station to the target parent node.

8. The method of claim 7, further comprising:
    receiving a message from the target parent node indicating that a handover for the M-IAB base station was successfully completed; and
    releasing the backhaul link for the M-IAB base station, in response to receiving the message indicating that the handover for the M-IAB base station was successfully completed.

9. A device comprising:
    a processor configured to:
        establish a backhaul link for a mobile integrated access and backhaul (M-IAB) base station;
        provide configuration data to the M-IAB base station, in response to establishing the backhaul link, wherein the configuration data causes the M-IAB base station to report when a first triggering condition, which is selected by the processor among a plurality of triggering conditions based on a speed of the M-IAB base station, for preparing a handover to a target parent node is satisfied;
        detect that the first triggering condition is satisfied;
        send a request to the target parent node to prepare the handover, in response to detecting that the first triggering condition is satisfied; and
        perform the handover of the M-IAB base station to the target parent node when a second triggering condition is satisfied, by the processor or by the M-IAB base station,
        wherein the second triggering condition is different from the first triggering condition.

10. The device of claim 9, wherein the processor is further configured to:
    receive information relating to a trajectory of the M-IAB base station;
    generate a neighbor parent list of base stations based on the received information; and
    include the generated neighbor parent list in the configuration data provided to the M-IAB base station.

11. The device of claim 9, wherein the first triggering condition specifies a difference between signal strengths of the device and the target parent node, wherein the signal strengths are measured by the M-IAB base station.

12. The device of claim 9, wherein the configuration data includes contention-less random access channel (RACH) information for the target parent node.

13. The device of claim 9, wherein the request instructs the target parent node to perform admission control for the M-IAB base station.

14. The device of claim 9, wherein the request instructs the target parent node to set up a communication tunnel to a User Plane Function (UPF) device processing data traffic for the M-IAB base station.

15. The device of claim 9, wherein the processor is further configured to:
    forward data for communication sessions associated with the M-IAB base station to the target parent node.

16. The device of claim 15, wherein the processor is further configured to:
- receive a message from the target parent node indicating that a handover for the M-IAB base station was successfully completed; and
- release the backhaul link for the M-IAB base station, in response to receiving the message indicating that the handover for the M-IAB base station was successfully completed.

17. A system comprising:
- a mobile integrated access and backhaul (M-IAB) base station configured to:
  - serve a plurality of user equipment (UE) devices; and
- a parent base station configured to:
  - establish a backhaul link for the M-IAB base station;
  - provide configuration data to the M-IAB base station, in response to establishing the backhaul link, wherein the configuration data causes the M-IAB base station to report when a first triggering condition, which is selected by the parent base station among a plurality of triggering conditions based on a speed of the M-IAB base station, for preparing a handover to a target parent node is satisfied;
  - detect that the first triggering condition is satisfied;
  - send a request to the target parent node to prepare the handover, in response to detecting that the first triggering condition is satisfied; and
  - perform the handover of the M-IAB base station to the target parent node when a second triggering condition is satisfied, by the parent base station or by the M-IAB base station, wherein the M-IAB base station is further configured to:
- detect that a handover condition is satisfied; and
- send a handover request to the target parent node using the configuration data, in response to detecting that the handover condition is satisfied, and wherein the second triggering condition is different from the first triggering condition.

18. The system of claim 17, wherein the configuration data includes:
- a neighbor parent list of base stations generated based on a trajectory of the M-IAB base station; and
- contention-less random access channel (RACH) information for the target parent node.

19. The system of claim 17, wherein the configuration data includes contention-less random access channel (RACH) information for the target parent node.

20. The system of claim 17, wherein the request instructs the target parent node to perform admission control for the M-IAB base station.

* * * * *